United States Patent
Gonshorowitz et al.

(10) Patent No.: US 12,177,184 B1
(45) Date of Patent: *Dec. 24, 2024

(54) TECHNIQUES FOR CYBERSECURITY RISK-BASED FIREWALL CONFIGURATION

(71) Applicant: Wiz, Inc., New York, NY (US)

(72) Inventors: Lidor Gonshorowitz, Tel Aviv (IL); Oron Noah, Geulim (IL); Ami Luttwak, Binyamina (IL); Yinon Costica, Tel Aviv (IL); Roy Reznik, Tel Aviv (IL)

(73) Assignee: Wiz, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/435,762

(22) Filed: Feb. 7, 2024

Related U.S. Application Data

(63) Continuation of application No. 18/469,159, filed on Sep. 18, 2023, now Pat. No. 11,936,622.

(51) Int. Cl.
*H04L 9/40* (2022.01)

(52) U.S. Cl.
CPC ...... *H04L 63/0263* (2013.01); *H04L 63/1433* (2013.01)

(58) Field of Classification Search
CPC .................. H04L 63/0263; H04L 63/1433
See application file for complete search history.

(56) References Cited

U.S. PATENT DOCUMENTS

| | | | |
|---|---|---|---|
| 8,024,482 B2 | 9/2011 | Hoogerwerf et al. | |
| 8,561,154 B2 * | 10/2013 | Bunn | H04L 63/102 |
| | | | 713/169 |
| 11,477,162 B2 | 10/2022 | Wang et al. | |
| 11,640,470 B1 * | 5/2023 | Amar | G06Q 10/0635 |
| | | | 726/22 |
| 11,652,793 B2 | 5/2023 | Gurney | |
| 11,799,874 B1 | 10/2023 | Lichtenstein et al. | |
| 11,936,622 B1 * | 3/2024 | Gonshorowitz | H04L 63/1433 |
| 2006/0059551 A1 | 3/2006 | Borella | |
| 2008/0256593 A1 * | 10/2008 | Vinberg | G06Q 10/06 |
| | | | 726/1 |
| 2020/0007571 A1 * | 1/2020 | Gottschalk | H04L 63/0227 |
| 2020/0204574 A1 * | 6/2020 | Christian | G06F 18/23 |
| 2021/0006542 A1 * | 1/2021 | Myneni | H04L 63/20 |
| 2021/0105294 A1 * | 4/2021 | Kruse | H04L 63/145 |
| 2022/0239702 A1 * | 7/2022 | Al Jarri | H04L 63/1425 |

(Continued)

FOREIGN PATENT DOCUMENTS

| | | |
|---|---|---|
| CN | 106878302 A | 6/2017 |
| CN | 107038376 A | 8/2017 |

(Continued)

*Primary Examiner* — Sarah Su
(74) *Attorney, Agent, or Firm* — M&B IP Analysts, LLC

(57) ABSTRACT

A system and method for providing dynamic network traffic policies is provided. The method includes: inspecting a workload for a cybersecurity object, the cybersecurity object indicating a cybersecurity risk, wherein the workload is deployed in a cloud computing environment having a firewall connected to an external network; detecting the cybersecurity risk on the workload based on the cybersecurity object; generating a policy for the firewall based on the cybersecurity risk; and configuring the firewall to apply the generated policy.

21 Claims, 5 Drawing Sheets

(56) References Cited

U.S. PATENT DOCUMENTS

| | | | |
|---|---|---|---|
| 2023/0156026 A1* | 5/2023 | Kim | H04L 63/1416 726/23 |
| 2023/0208873 A1 | 6/2023 | Gabay et al. | |
| 2023/0259640 A1* | 8/2023 | Metzler | G06F 21/6218 713/191 |
| 2023/0336578 A1 | 10/2023 | Lidgi et al. | |
| 2023/0388325 A1 | 11/2023 | Gilad et al. | |
| 2023/0388352 A1 | 11/2023 | Gilad et al. | |
| 2023/0421573 A1 | 12/2023 | Lichtenstein et al. | |
| 2024/0039936 A1* | 2/2024 | Pisha | H04L 63/1416 |
| 2024/0098100 A1* | 3/2024 | Lal | H04L 63/1441 |

FOREIGN PATENT DOCUMENTS

| | | | | |
|---|---|---|---|---|
| CN | 111756692 A | * | 10/2020 | H04L 63/10 |
| CN | 115021997 A | * | 9/2022 | G06N 20/00 |
| WO | 2021018803 A1 | | 2/2021 | |
| WO | 2022165061 A1 | | 8/2022 | |

* cited by examiner

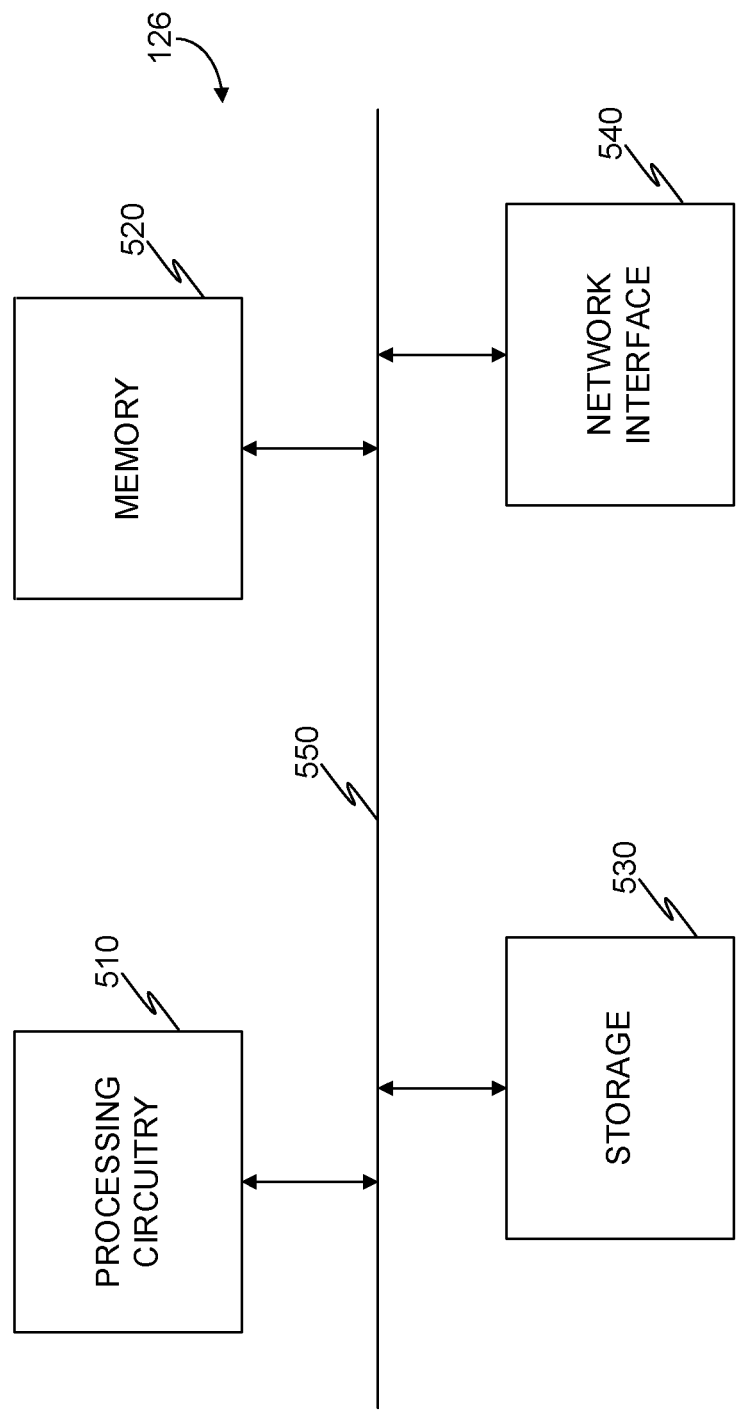

TECHNIQUES FOR CYBERSECURITY RISK-BASED FIREWALL CONFIGURATION

CROSS-REFERENCED TO RELATED APPLICATIONS

This application is a continuation of U.S. patent application Ser. No. 18/469,159 filed Sep. 18, 2023, now allowed, the contents of which are hereby incorporated by reference.

TECHNICAL FIELD

The present disclosure relates generally to network traffic management, and specifically to cybersecurity monitoring systems configured to provide dynamic risk-based network traffic management.

BACKGROUND

A network firewall is a security device, integral in today's computing network. A firewall is often implemented as a measure to manage network traffic, for example to a cloud computing environment, between cloud computing environments, between components, also known as nodes, of a network environment, and the like.

As another example, a firewall can be utilized to form a barrier between a trusted network environment, and an untrusted network environment. Use of a firewall, however, also has a downside. For example, IP addresses may be filtered at the firewall. While generally IP addresses are static, they do change, so such a filter might, over time, block traffic which should be allowed, while allowing traffic which should not.

As any security measure, the advantage provided by the added layer of security can easily equate to a disadvantage if the benefit is not realized.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include detecting a cybersecurity risk on a workload deployed in a cloud computing environment, the cloud computing environment having a firewall connected to an untrusted network. Method may also include configuring the firewall to filter network traffic to the workload based on the detected cybersecurity risk. Other embodiments of this aspect include corresponding computer systems, apparatus, and computer programs recorded on one or more computer storage devices, each configured to perform the actions of the methods.

Implementations may include one or more of the following features. Method may include: inspecting the workload for a cybersecurity object; and detecting the cybersecurity risk based on the cybersecurity object. Method may include: generating an inspectable disk based on an original disk of the workload; and configuring an inspector to inspect the inspectable disk for the cybersecurity object. Method may include: cloning the original disk into the inspectable disk. Method may include: configuring the firewall to block network traffic to the workload, in response to determining that the cybersecurity risk is of a first type. Method may include: initiating a mitigation action based on the detected cybersecurity risk. Method may include: tagging the workload with a tag indicating the detected cybersecurity risk. Method may include: storing the tag indicating the cybersecurity risk on any one of: a security database, the workload, and a combination thereof. Method may include: configuring the firewall to filter only certain network traffic to the workload, based on the detected cybersecurity risk. Method may include: configuring the firewall to detect incoming network traffic to the workload; configuring the firewall to block incoming network traffic to the workload in response to detecting incoming network traffic of a first type exceeding a threshold. Method may include: configuring the firewall to remove the filter in response to detecting that the cybersecurity risk is removed from the workload. Implementations of the described techniques may include hardware, a method or process, or a computer tangible medium.

In one general aspect, non-transitory computer-readable medium may include one or more instructions that, when executed by one or more processors of a device, cause the device to: detect a cybersecurity risk on a workload deployed in a cloud computing environment, the cloud computing environment having a firewall connected to an untrusted network. Medium may furthermore include configure the firewall to filter network traffic to the workload based on the detected cybersecurity risk. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: detect a cybersecurity risk on a workload deployed in a cloud computing environment, the cloud computing environment having a firewall connected to an untrusted network. System may in addition configure the firewall to filter network traffic to the workload based on the detected cybersecurity risk. Other embodiments of this aspect include corresponding computer systems, apparatus, and computer programs recorded on one or more computer storage devices, each configured to perform the actions of the methods.

Implementations may include one or more of the following features. System where the memory contains further instructions which when executed by the processing circuitry further configure the system to: inspect the workload for a cybersecurity object; and detect the cybersecurity risk based on the cybersecurity object. System where the memory contains further instructions which when executed by the processing circuitry further configure the system to: generate an inspectable disk based on an original disk of the workload; and configure an inspector to inspect the inspectable disk for the cybersecurity object. System where the memory contains further instructions which when executed by the processing circuitry further configure the system to: clone the original disk into the inspectable disk. System where the memory contains further instructions which when executed by the processing circuitry further configure the system to: configure the firewall to block network traffic to the workload, in response to determining that the cybersecurity risk is of a first type. System where the memory contains further instructions which when executed by the processing circuitry further configure the system to: initiate a mitigation action based on the detected cybersecurity risk. System where the memory contains further instructions which when executed by the processing circuitry further configure the system to: tag the workload with a tag indicating the detected cybersecurity risk. System where the memory contains further instructions which when executed by the processing circuitry further configure the system to: store the tag indicating the cybersecurity risk on any one of: a security database, the workload, and a combination thereof. System where the memory contains further instructions which when executed by the processing circuitry further configure the system to: configure the firewall to filter only certain network traffic to the workload, based on the detected cybersecurity risk. System where the memory contains further instructions which when executed by the processing circuitry further configure the system to: configure the firewall to detect incoming network traffic to the workload; and configure the firewall to block incoming network traffic to the workload in response to detecting incoming network traffic of a first type exceeding a threshold. System where the memory contains further instructions which when executed by the processing circuitry further configure the system to: configure the firewall to remove the filter in response to detecting that the cybersecurity risk is removed from the workload. Implementations of the described techniques may include hardware, a method or process, or a computer tangible medium.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Implementations may include one or more of the following features. Method may include: determining a severity of the cybersecurity risk based on the detected cybersecurity object; generating a network traffic policy based on the determined severity; and configuring the firewall to apply the generated network traffic policy. Method may include: determining that the cybersecurity risk is any one of: a misconfiguration, a vulnerability, an exposure, an attack path, a reachability path, and a combination thereof. Implementations of the described techniques may include hardware, a method or process, or a computer tangible medium.

Implementations may include one or more of the following features. System where the memory contains further instructions which when executed by the processing circuitry further configure the system to: determine a severity of the cybersecurity risk based on the detected cybersecurity object; generate a network traffic policy based on the determined severity; and configure the firewall to apply the generated network traffic policy. System where the memory contains further instructions which when executed by the processing circuitry further configure the system to: determine that the cybersecurity risk is any one of: a misconfiguration, a vulnerability, an exposure, an attack path, a reachability path, and a combination thereof. Implementations of the described techniques may include hardware, a method or process, or a computer tangible medium.

In one general aspect, method may include inspecting a workload for a cybersecurity object, the cybersecurity object indicating a cybersecurity risk, where the workload is deployed in a cloud computing environment having a firewall connected to an external network. Method may also include detecting the cybersecurity risk on the workload based on the cybersecurity object. Method may furthermore include generating a policy for the firewall based on the cybersecurity risk. Method may in addition include configuring the firewall to apply the generated policy. Other embodiments of this aspect include corresponding computer systems, apparatus, and computer programs recorded on one or more computer storage devices, each configured to perform the actions of the methods.

Implementations may include one or more of the following features. Method may include: detecting a second cybersecurity object on the workload; and detecting that the cybersecurity risk is a toxic combination based on the cybersecurity object and the second cybersecurity object. Method where the cybersecurity risk is any one of: a misconfiguration, a vulnerability, an exposure, an attack path, a reachability path, and a combination thereof. Method may include: determining a severity of the cybersecurity risk based on a detected cybersecurity object; and generating the policy based on the determined severity. Method may include: detecting an original disk associated with the workload; cloning the original disk into an inspectable disk; and inspecting the inspectable disk for the cybersecurity object. Method may include: configuring the firewall to block network traffic to the workload, in response to determining that the cybersecurity risk is of a first type. Method may include: configuring the firewall to block network traffic to the workload, in response to determining that the cybersecurity object is of a first type. Method may include: configuring the firewall, based on the generated policy, to block network traffic of a first type to the workload; and configuring the firewall, based on the generated policy, to allow network traffic of a second type to the workload. Method may include: initiating a mitigation action based on the detected cybersecurity risk. Method may include: configuring the firewall to remove the policy in response to detecting that the cybersecurity risk is removed from the workload. Implementations of the described techniques may include hardware, a method or process, or a computer tangible medium.

In one general aspect, system may include a processing circuitry. System may also include a memory, the memory containing instructions that, when executed by the processing circuitry, configure the system to: inspect a workload for a cybersecurity object, the cybersecurity object indicating a cybersecurity risk, where the workload is deployed in a cloud computing environment having a firewall connected to an external network. System may in addition detect the cybersecurity risk on the workload based on the cybersecurity object. System may moreover generate a policy for the firewall based on the cybersecurity risk. System may also configure the firewall to apply the generated policy. Other embodiments of this aspect include corresponding computer systems, apparatus, and computer programs recorded on one or more computer storage devices, each configured to perform the actions of the methods.

Implementations may include one or more of the following features. System where the memory contains further instructions which when executed by the processing circuitry further configure the system to: detect a second cybersecurity object on the workload; and detect that the cybersecurity risk is a toxic combination based on the cybersecurity object and the second cybersecurity object. System where the cybersecurity risk is any one of: a misconfiguration, a vulnerability, an exposure, an attack path, a reachability path, and a combination thereof. System where the memory contains further instructions which when executed by the processing circuitry further configure the system to: determine a severity of the cybersecurity risk based on a detected cybersecurity object; and generate the policy based on the determined severity. System where the memory contains further instructions which when executed by the processing circuitry further configure the system to: detect an original disk associated with the workload; clone the original disk into an inspectable disk; and inspect the inspectable disk for the cybersecurity object. System where the memory contains further instructions which when executed by the processing circuitry further configure the system to: configure the firewall to block network traffic to the workload, in response to determining that the cybersecurity risk is of a first type. System where the memory contains further instructions which when executed by the processing circuitry further configure the system to: configure the firewall to block network traffic to the workload, in response to determining that the cybersecurity object is of a first type. System where the memory contains further instructions which when executed by the processing circuitry further configure the system to: configure the firewall, based on the generated policy, to block network traffic of a first type to the workload; and configure the firewall, based on the generated policy, to allow network traffic of a second type to the workload. System where the memory contains further instructions which when executed by the processing circuitry further configure the system to: initiate a mitigation action based on the detected cybersecurity risk. System where the memory contains further instructions which when executed by the processing circuitry further configure the system to: configure the firewall to remove the policy in response to detecting that the cybersecurity risk is removed from the workload. Implementations of the described techniques may include hardware, a method or process, or a computer tangible medium.

In one general aspect, non-transitory computer-readable medium may include one or more instructions that, when executed by one or more processors of a device, cause the device to: inspect a workload for a cybersecurity object, the cybersecurity object indicating a cybersecurity risk, where the workload is deployed in a cloud computing environment having a firewall connected to an external network; detect the cybersecurity risk on the workload based on the cybersecurity object; and generate a policy for the firewall based on the cybersecurity risk; and configure the firewall to apply the generated policy. Other embodiments of this aspect include corresponding computer systems, apparatus, and computer programs recorded on one or more computer storage devices, each configured to perform the actions of the methods.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 5 is an example schematic diagram of an inspection controller according to an embodiment.

DETAILED DESCRIPTION

Figure 1:
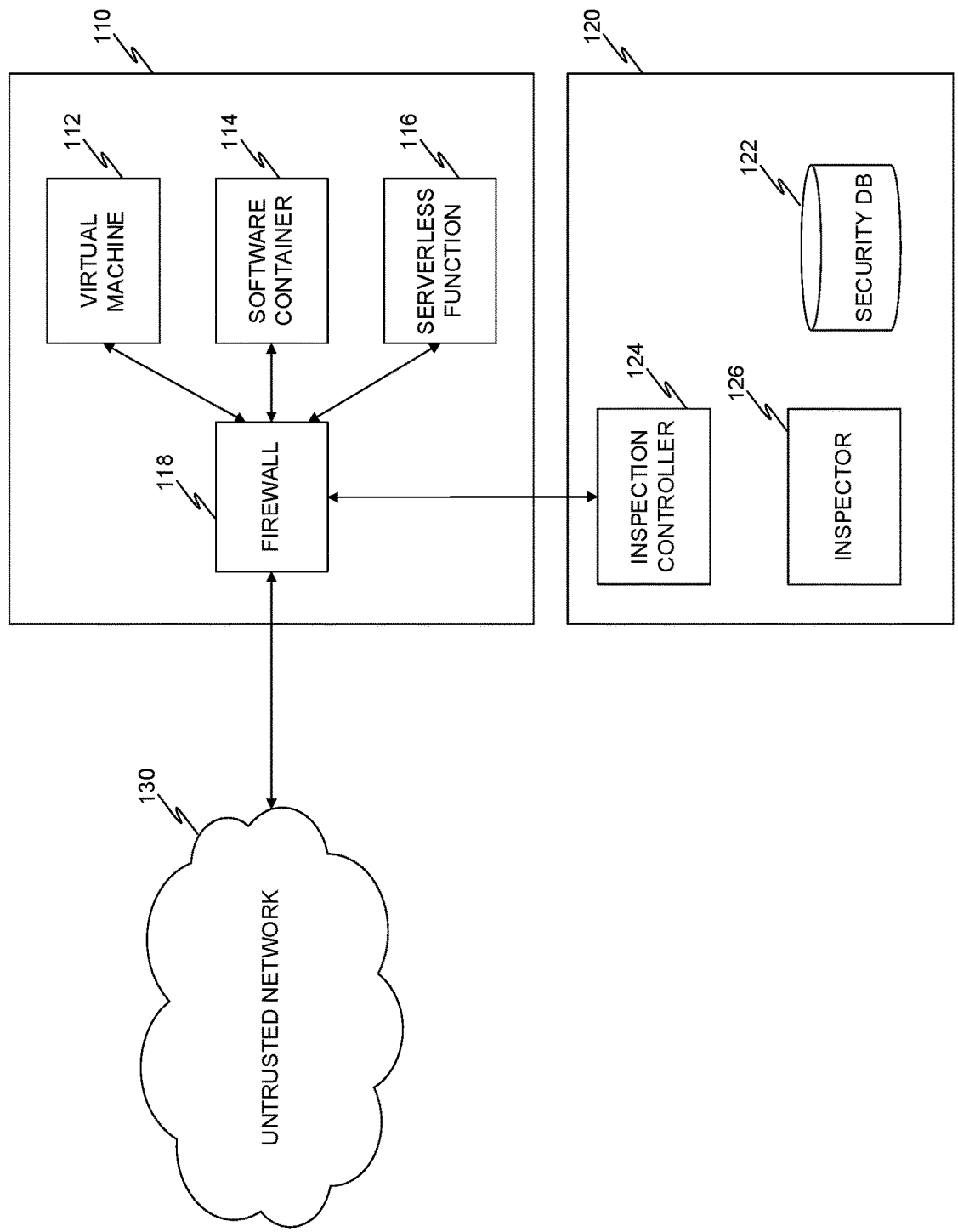
FIG. 1 is an example network diagram of a computing environment including a dynamic policy firewall, utilized to describe an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for providing dynamic network traffic policies. According to an embodiment, a network filtering policy is generated based on a cybersecurity object, a cybersecurity risk, a combination thereof, and the like, detected on a workload in a computing environment, such as a cloud computing environment.

In an embodiment, a firewall is continuously configured with dynamic network traffic policies based on continuously detecting cybersecurity objects in a networked computing environment. In some embodiments, a policy includes an eviction mechanism, such that after a predetermined time has lapsed, the policy is evicted from the firewall. In some embodiments, the policy is generated based on a risk, a vulnerability, a misconfiguration, an exposure, a threat, an attack path, a reachability path, a combination thereof, and the like. In some embodiments, the network traffic policy is further generated based on a severity score assigned to the cybersecurity risk. For example, a workload having a misconfigured database has a cybersecurity risk score of "medium", while a workload having a misconfigured database storing thereon sensitive data has a cybersecurity risk score of "severe", according to an embodiment. In certain embodiments, the network traffic is modified based on a combination of detecting a cybersecurity object and a cybersecurity risk on the same workload.

While it is understood that a human might generate a policy for filtering network traffic, it is immediately evident that a human cannot detect a cybersecurity risk on a workload in a cloud computing environment, nor can a human generate a policy based on such detection. For example, the human mind is not equipped to inspect a workload for a cybersecurity object, nor is it equipped to perform, for example, deep packet inspection to determine if a packet passing through a firewall conforms to a dynamic policy or not.

FIG. 1 is an example network diagram of a computing environment including a dynamic policy firewall, utilized to describe an embodiment. In an embodiment, a computing environment 110 includes a plurality of entities. In some embodiments, an entity is, for example, a resource, a principal, a cloud entity, and the like. In certain embodiments, a resource is, for example, a virtual machine 112, a software container 114, a serverless function 116, a combination thereof, and the like.

According to an embodiment, a virtual machine 112 is implemented utilizing Oracle® VirtualBox®. In some embodiments, a software container 114 is implemented utilizing a Docker® platform, a Kubernetes® platform, a combination thereof, and the like. In an embodiment, a serverless function 116 is implemented utilizing, for example, Amazon® Lambda functions.

In some embodiments, the computing environment 110 includes a principal, such as a user account, a service account, a role, a combination thereof, and the like. In an embodiment, the computing environment 110 is a cloud computing environment, a hybrid computing environment, a network computer environment, a combination thereof, and the like. In some embodiments, the computing environment 110 is implemented on a plurality of computing environments.

In an embodiment, a cloud computing environment is, for example, a virtual private cloud (VPC), a virtual network (VNet). In certain embodiments, the cloud computing environment is implemented on a cloud computing infrastructure, such as Amazon® Web Service (AWS), Google® Cloud Platform (GCP), Microsoft® Azure®, a combination thereof, and the like.

According to an embodiment, the computing environment 110 includes a firewall 118. In an embodiment, the firewall 118 is a software appliance, a hardware appliance, a combination thereof, and the like. In certain embodiments, the firewall 118 is a network-based system, a host-based system, a combination thereof, and the like. According to an embodiment, the firewall 118 is deployed in the computing environment 110, between the computing environment 110 and an untrusted network 130, a combination thereof, and the like. In an embodiment, an untrusted network 130 is a public network, such as, for example, the Internet.

In some embodiments, the firewall 118 is configured to filter packets. In certain embodiments, the firewall 118 includes an access control list. In an embodiment, an access control list is utilized to filter what packets should pass and what packets should be dropped (i.e., blocked).

In certain embodiments, the firewall 118 is configured to filter network traffic at an application layer. In an embodiment, an application firewall is implemented for example, as a web application firewall (WAF). In some embodiments, the firewall 118 is further configured to perform deep packet inspection.

In some embodiments, the firewall 118 includes a routing table, a policy, a rule, a combination thereof, and the like. For example, in an embodiment, a firewall 118 is configured to receive a data packet, a network packet, and the like, and apply a policy, a rule, and the like, to the received packet. In an embodiment, a policy for example, includes an action, such that when the policy is applied to a received packet, the action is initiated. For example, an action can be to pass the packet into a network, pass the packet from the network, drop the packet, send an error response, a combination thereof, and the like.

In an embodiment, the firewall 118 is configured to communicate with an inspection environment and receive a generated policy, a dynamic policy, a combination thereof, and the like, and apply such a policy to network traffic passing through the firewall 118.

In certain embodiments, an inspection environment 120 is configured to inspect a computing environment, such as computing environment 110, for a cybersecurity object. In some embodiments, the inspection environment 120 is further configured to determine a cybersecurity risk based on detection of a cybersecurity object, a plurality of cybersecurity objects, and the like.

According to an embodiment, an inspection environment 120 is deployed, for example, as a cloud computing environment, an account in a cloud environment of the computing environment 110, a combination thereof, and the like.

In some embodiments, the inspection environment 120 includes an inspection controller 124, an inspector 126, a security database 122, and the like. In certain embodiments, the inspection controller 124, the inspector 126, the security database 122, and the like, are implemented utilizing a virtual machine, a software container, a serverless function, a combination thereof, and the like.

In an embodiment, the inspector 126, the inspection controller 124, and the like, are further configured to assume a role, access a service account, and the like, in the computing environment 110. For example, in an embodiment, an inspector 126 is configured to assume a role in the computing environment 110 which grants a permission to the inspector 126 to generate an inspectable disk, for example based on an original disk of the virtual machine 112.

For example, according to an embodiment, an inspection controller 124 is configured to provision an inspector 126 to inspect an original disk, for example of a virtual machine 112, for a cybersecurity object. In an embodiment, a cybersecurity object is indicative of a cybersecurity risk.

In certain embodiments, the inspection controller 124 is configured to initiate an action which generates an inspectable disk from an original disk, wherein the original disk is deployed in the computing environment 110. In an embodiment, the inspectable disk is generated by cloning, copying, generating a snapshot, a combination thereof, and the like.

In some embodiments, the inspector 126 is configured to inspect a disk, a workload, and the like, for a cybersecurity object, a cybersecurity risk, a cybersecurity threat, a combination thereof, and the like. In an embodiment, a cybersecurity object, is for example, a password (e.g., stored as text), a certificate, an encryption key, an application, an operating system, a code object, a registry file, a hash value, sensitive data, a combination thereof, and the like. In some embodiments, the inspector 126 is configured to detect a malware object, a misconfiguration, a vulnerability, an exposure, a combination thereof, and the like.

In an embodiment, the inspector 126 is configured to detect a malware, for example, by generating a signature, a hash, a combination thereof, and the like, from a cybersecurity object detected on an inspectable disk, and compare the generated signature, hash, and the like, to a signature received from a malware database.

In certain embodiments, a security database 122 includes a representation of a computing environment, such as computing environment 110. In an embodiment, the representation includes a representation of entities of the computing environment 110. For example, in an embodiment, an entity is a cloud entity, such as a resource, a principal, and the like. In some embodiments, enrichments, cybersecurity objects, mitigation actions, and the like, are further represented in the representation stored on the security database 122.

For example, according to an embodiment, the security database 122 is a graph database (e.g., Neo4j®) which stores thereon a security graph which includes a representation of the computing environment 110. In an embodiment, an inspector 126, the inspection controller 124, and the like, are configured to populate the security graph (or other database structure). For example, in an embodiment, an inspector 126 is configured to detect entities, cloud entities, workloads, resources, principals, and the like, in a computing environment.

Each cloud entity is represented, for example, as a node in the graph. An edge connecting a pair of nodes indicates, according to an embodiment, a relationship, a directional relationship, and the like, between the pair of nodes. In some embodiments, a node is generated based on a unified data schema. For example, in an embodiment, a data schema includes a plurality of templates, each template corresponding to an entity. In an embodiment, a first template of the data schema corresponds to a resource, such that the first template is utilized in generating a representation of a resource, workload, and the like, such as the virtual machine 112, the software container 114, the serverless function 116, and the like.

In certain embodiments, the generated representation utilizes the unified data schema for a plurality of different computing environments. For example, a first computing environment is deployed on AWS, while a second computing environment is deployed on GCP, and a representation of both is generated based on the same unified data schema.

In an embodiment, an inspection controller 124 is configured to generate a policy for a firewall 118 based on a cybersecurity object, a cybersecurity risk, a cybersecurity threat, and the like. In some embodiments, the policy is generated based on detecting a cybersecurity object on a workload.

In certain embodiments, the policy for the firewall 118 is generated based on detecting a cybersecurity risk. In an embodiment, a cybersecurity risk is detected, determined, and the like, based on detecting a cybersecurity object on a workload. For example, in an embodiment, a cybersecurity risk is determined based on detecting a cybersecurity object, and detecting an exposure, both on the same workload. In certain embodiments, the policy is generated based on detecting a combination of a cybersecurity object and: a cybersecurity exposure, a misconfiguration, a vulnerability, a combination thereof, and the like.

In some embodiments, a workload includes a sensor deployed thereon (not shown). In certain embodiments, the sensor is configured to detect runtime data of the workload. In an embodiment, the sensor is configured to listen to a data link layer of the workload, a kernel space of the workload, and the like. In some embodiments, the sensor is configured to send events detected in the runtime data to the inspection environment 120.

In an embodiment, the policy is further generated based on an event detected by a sensor. For example, in an embodiment, a policy is generated based on an event detected by a sensor, a cybersecurity object detected by an inspector, a cybersecurity threat, a cybersecurity risk, a misconfiguration, an exposure, a vulnerability, a combination thereof, and the like.

Figure 2:
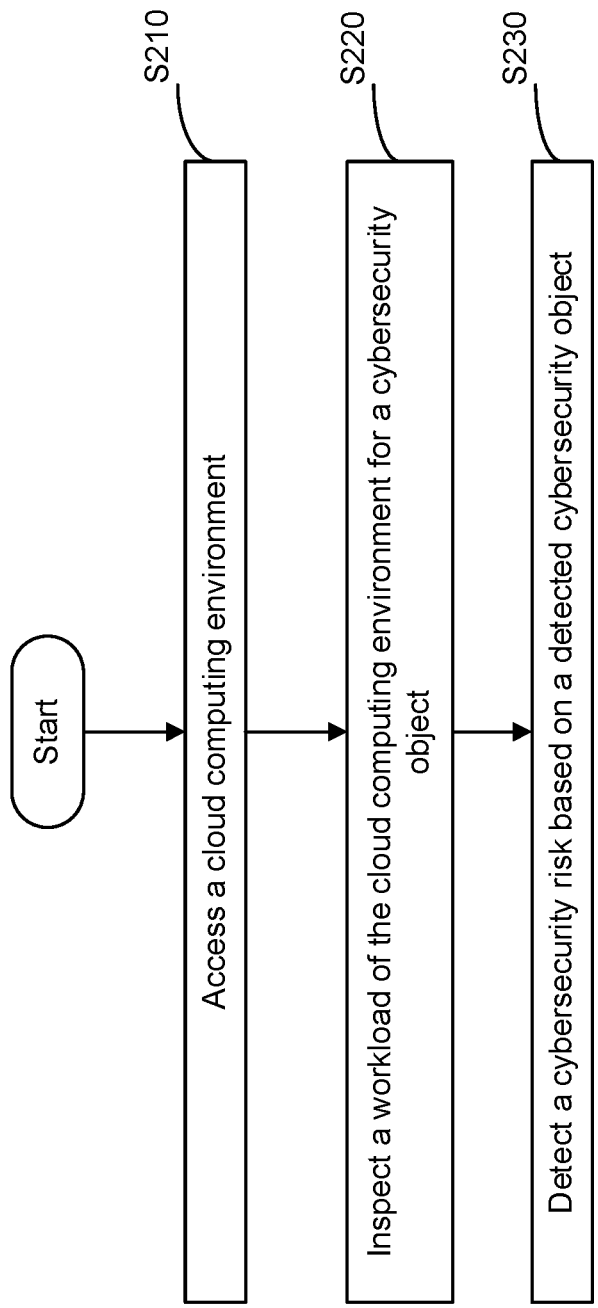
FIG. 2 is an example flowchart of a method for determining a cybersecurity risk, utilized to describe an embodiment.

FIG. 2 is an example flowchart of a method for determining a cybersecurity risk, utilized to describe an embodiment. In an embodiment, a cybersecurity risk is determined based on detecting a cybersecurity object on a workload, and further determining that the workload includes a vulnerability, an exposure, a misconfiguration, and the like.

At S210, a computing environment is accessed. In an embodiment, the computing environment is a cloud computing environment, such as a virtual private cloud deployed on Amazon® Web Service. In some embodiments, accessing a computing environment includes configuring an inspector, an inspection controller, and the like, to assume a role, a service account, a principal, and the like, in the computing environment.

In some embodiments, the principal is configured to generate an inspectable disk based on an original disk detected in the computing environment. In an embodiment, the inspectable disk is generated in the computing environment, in the inspection environment, in an account of the inspection environment, in an account of the computing environment, in a combination thereof, and the like.

In certain embodiments, the inspectable disk is generated based on a clone, a copy, a snapshot, a combination thereof, and the like, of the original disk. For example, in an embodiment, an inspection controller is configured to generate a clone of an original disk into an inspection account. This is advantageous, according to some embodiments, as it utilizes less resources in the target account (i.e., the account which is deployed in the computing environment and is being inspected).

At S220, a workload is inspected for a cybersecurity object. In an embodiment, the workload is a virtual machine, a software container, a serverless function, a combination thereof, and the like. In some embodiments, an inspector is configured to detect the cybersecurity object, a plurality of cybersecurity objects, and the like. In an embodiment, an inspector is configured to detect a plurality of cybersecurity objects, including a first cybersecurity object of a first type (e.g., an encryption key), and a second cybersecurity object of a second type (e.g., a software application).

In certain embodiments, a cybersecurity object is a password, a certificate, an encryption key, an application, an operating system, a code object, a registry file, a hash value, sensitive data, a malware object, a combination thereof, and the like. In some embodiments, an inspector is configured to detect a misconfiguration, a vulnerability, an exposure, a combination thereof, and the like.

In some embodiments, in response to determining that inspection is concluded, an inspectable disk is de-provisioned. In certain embodiments, de-provisioning an inspectable disk includes releasing a resource provisioned to the inspectable disk by a computing environment. For example, in an embodiment, resources (e.g., a processor, a memory, a storage, etc.) are allocated (i.e., provisioned) to a virtual instance, such as a virtual disk, a virtual machine, a software container, a serverless function, and the like.

At S230, a cybersecurity risk is detected. In an embodiment, the cybersecurity risk is determined based on detecting a cybersecurity object. In some embodiments, a cybersecurity risk is determined based on detecting a cybersecurity object and any one of: a misconfiguration, a vulnerability, an exposure, a combination thereof, and the like.

In certain embodiments, a cybersecurity risk is indicated by detecting a cybersecurity object and a vulnerability on the same workload. In an embodiment, a vulnerability is detected by an inspector on a workload. In some embodiments, the vulnerability is represented in a security database, for example as a node in a security graph.

In some embodiments, a node representing a workload is connected to a node representing a vulnerability, to indicate that the workload includes the vulnerability. In some embodiments, the node representing the vulnerability further includes a remediation action.

In certain embodiments, in response to determining that a workload includes a cybersecurity risk, a mitigation is initiated. In an embodiment, the mitigation action is initiated based on a remediation action, indicated by the a node representing a vulnerability.

Figure 3:
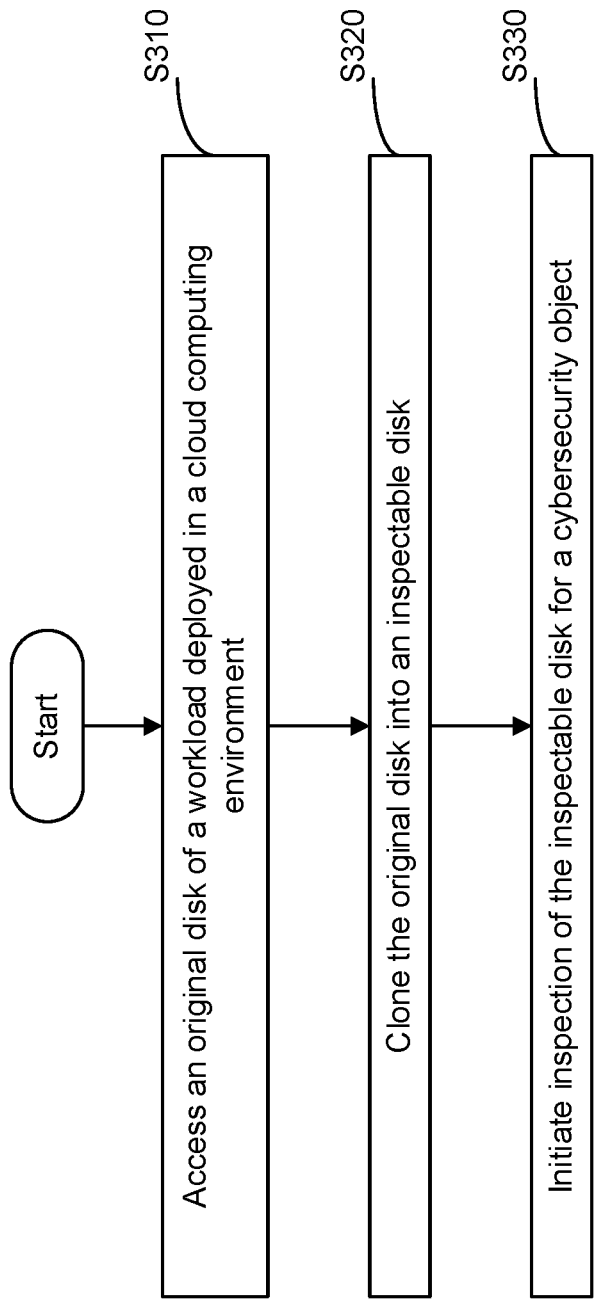
FIG. 3 is an example flowchart of a method for inspecting a workload for a cybersecurity object, utilized to describe an embodiment.

FIG. 3 is an example flowchart of a method for inspecting a workload for a cybersecurity object, utilized to describe an embodiment.

At S310 an original disk of a workload deployed in a cloud computing environment is accessed. In an embodiment, the computing environment is a cloud computing environment, such as a virtual private cloud deployed on Amazon® Web Service. In an embodiment, the workload is a virtual machine, a software container, a serverless function, a combination thereof, and the like. In some embodiments, accessing a computing environment includes configuring an inspector, an inspection controller, and the like, to assume a role, a service account, a principal, and the like, in the computing environment.

At S320 an original disk is cloned into an inspectable disk. In some embodiments, the principal is configured to generate an inspectable disk based on an original disk detected in the computing environment. In an embodiment, the inspectable disk is generated in the computing environment, in the inspection environment, in an account of the inspection environment, in an account of the computing environment, in a combination thereof, and the like.

In an embodiment, the inspectable disk is generated based on a clone of the original disk. For example, in an embodiment, an inspection controller is configured to generate a clone of an original disk into an inspection account. This is advantageous, according to some embodiments, as it utilizes less resources in the target account (i.e., the account which is deployed in the computing environment and is being inspected).

At S330 an inspector initiates inspection of the inspectable disk for a cybersecurity object. In certain embodiments, a cybersecurity object is a password, a certificate, an encryption key, an application, an operating system, a code object, a registry file, a hash value, sensitive data, a malware object, a combination thereof, and the like. In some embodiments, an inspector is configured to detect a misconfiguration, a vulnerability, an exposure, a combination thereof, and the like.

In some embodiments, in response to determining that inspection is concluded, an inspectable disk is de-provisioned. In certain embodiments, de-provisioning an inspectable disk includes releasing a resource provisioned to the inspectable disk by a computing environment. For example, in an embodiment, resources (e.g., a processor, a memory, a storage, etc.) are allocated (i.e., provisioned) to a virtual instance, such as a virtual disk, a virtual machine, a software container, a serverless function, and the like.

Figure 4:
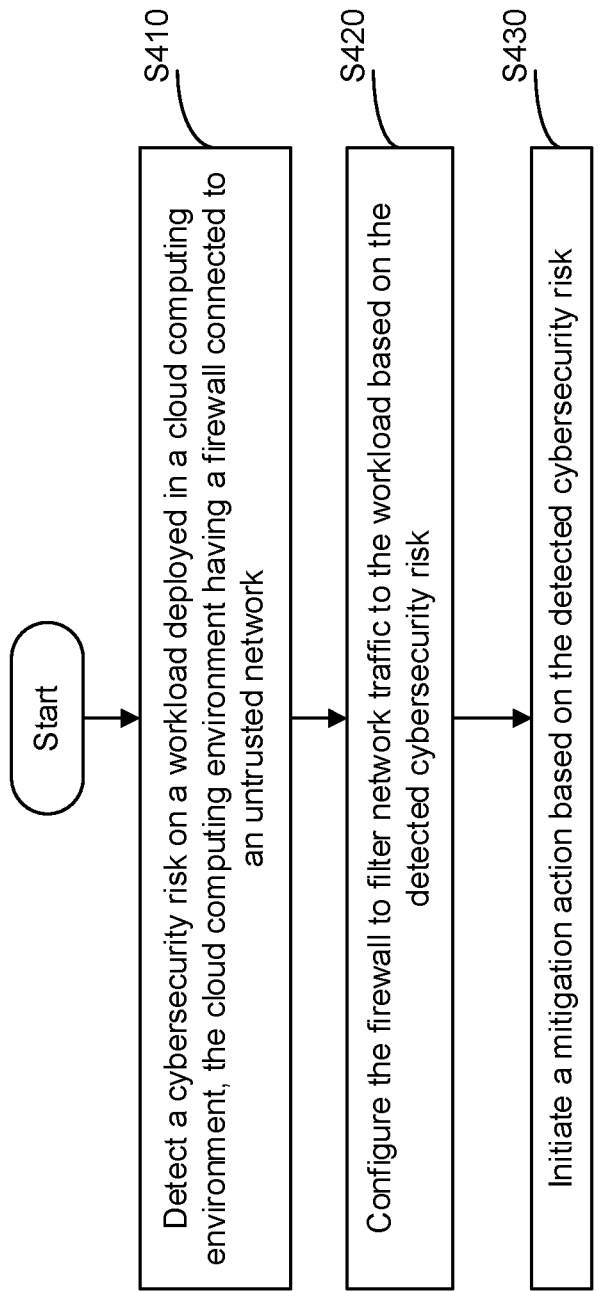
FIG. 4 is an example flowchart of a method for dynamic firewall configuration with a policy based on a cybersecurity risk, implemented according to an embodiment.

FIG. 4 is an example flowchart of a method for dynamic firewall configuration with a policy based on a cybersecurity risk, implemented according to an embodiment.

At S410, a cybersecurity risk is detected on a workload deployed in a cloud computing environment, the cloud computing environment having a firewall connected to an untrusted network. In an embodiment, the computing environment is a cloud computing environment, such as a virtual private cloud deployed on Amazon® Web Service. In an embodiment, the workload is a virtual machine, a software container, a serverless function, a combination thereof, and the like. In an embodiment, a firewall is a software appliance, a hardware appliance, a combination thereof, and the like. In certain embodiments, the firewall is a network-based system, a host-based system, a combination thereof, and the like.

In certain embodiments, a cybersecurity object is a password, a certificate, an encryption key, an application, an operating system, a code object, a registry file, a hash value, sensitive data, a malware object, a combination thereof, and the like. In some embodiments, an inspector is configured to detect a misconfiguration, a vulnerability, an exposure, a combination thereof, and the like.

In an embodiment, the cybersecurity risk is determined based on detecting a cybersecurity object. In some embodiments, a cybersecurity risk is determined based on detecting a cybersecurity object and any one of: a misconfiguration, a vulnerability, an exposure, a combination thereof, and the like.

In certain embodiments, a cybersecurity risk is indicated by detecting a cybersecurity object and a vulnerability on the same workload. In an embodiment, a vulnerability is detected by an inspector on a workload. In some embodiments, the vulnerability is represented in a security database, for example as a node in a security graph.

In some embodiments, a node representing a workload is connected to a node representing a vulnerability, to indicate that the workload includes the vulnerability. In some embodiments, the node representing the vulnerability further includes a remediation action.

At S420 a firewall is configured to apply a cybersecurity policy. In an embodiment, applying a cybersecurity policy includes filtering network traffic to the workload, from the workload, a combination thereof, and the like, based on the detected cybersecurity risk. In an embodiment, an inspection controller is configured to generate a policy for a firewall based on a cybersecurity object, a cybersecurity risk, a cybersecurity threat, and the like, for example such as discussed in more detail herein. In some embodiments, the policy is generated based on detecting a cybersecurity object on a workload.

In some embodiments, the firewall includes a routing table, a policy, a rule, a combination thereof, and the like. For example, in an embodiment, a firewall is configured to receive a data packet, a network packet, and the like, and apply a policy, a rule, and the like, to the received packet. In an embodiment, a policy for example, includes an action, such that when the policy is applied to a received packet, the action is initiated. For example, an action can be to pass the packet into a network, pass the packet from the network, drop the packet, send an error response, a combination thereof, and the like.

In an embodiment, the firewall is configured to communicate with an inspection environment and receive a generated policy, a dynamic policy, a combination thereof, and the like, and apply such a policy to network traffic passing through the firewall.

In an embodiment, the policy is further generated based on an event detected by a sensor. For example, in an embodiment, a policy is generated based on an event detected by a sensor, a cybersecurity object detected by an inspector, a cybersecurity threat, a cybersecurity risk, a misconfiguration, an exposure, a vulnerability, a combination thereof, and the like.

In some embodiments, a workload includes a sensor deployed thereon (not shown). In certain embodiments, the sensor is configured to detect runtime data of the workload. In an embodiment, the sensor is configured to listen to a data link layer of the workload, a kernel space of the workload, and the like. In some embodiments, the sensor is configured to send events detected in the runtime data to the inspection environment.

At S430 a mitigation action is initiated based on the detected cybersecurity risk. In certain embodiments, the mitigation action is initiated in response to determining that a workload includes a cybersecurity risk. In an embodiment, the mitigation action is initiated based on a remediation action, indicated by the a node representing a vulnerability.

In certain embodiments, an inspection controller is configured to perform another inspection (e.g., by configuring an inspector to inspect a workload again) in response to initiating the mitigation action, determining that the initiated mitigation action is complete, and the like.

In some embodiments, the inspector detects that the cybersecurity risk is no longer present on the workload at the another inspection. In certain embodiments, as a result of detecting no further cybersecurity risks during the another inspection, a firewall is configured to remove, evict, and the like, a previously applied network traffic policy correlated to the no longer detected cybersecurity risk.

For example, in an embodiment, an inspection controller is configured to perform an inspection (e.g., by configuring an inspector to inspect a workload). An inspector configured to detect the presence of malware as a cybersecurity risk detects a malware code object on a first workload. Accordingly, a policy is generated based on the first workload and the detected malware code object. For example, the policy is generated, according to an embodiment, based on an identifier of the first workload, such as an IP address, a MAC address, a name from a namespace, a combination thereof, and the like.

In some embodiments, the policy is further generated based on a protocol, such as TCP/IP, UDP, HTTP, FTP, SSH, a combination thereof, and the like. In an embodiment, a firewall is configured to apply a network filtering policy (e.g., to block network traffic such as in-bound, out-bound, and a combination thereof, to a specific destination).

In certain embodiments, a remediation action is initiated in response to detecting the malware. In some embodiments, the remediation action includes: configuring a workload to remove the malware, sandboxing the affected machine from the network, isolating infected resources on the compromised host system, a combination thereof, and the like.

In an embodiment, an inspection controller is configured to initiate another inspection. In certain embodiments, where the cybersecurity risk is detected as removed (e.g., no cybersecurity risk is detected at the subsequent inspection), a firewall is configured to remove, evict, and the like, a previously applied network traffic policy correlated to the no longer detected cybersecurity risk.

In some embodiments, a workload is inspected to detect a day one vulnerability. According to an embodiment, a day one vulnerability (also known as a 1 day vulnerability, exploit, and the like) is a vulnerability in a software application, operating system, code object, and the like, which becomes a known vulnerability. These are often known, but not yet patched as there is not enough time to analyze and prepare a software path to address the issue. In an embodiment, an inspector is configured to detect a day one vulnerability, and a policy is generated based on an identifier of a workload including the day one vulnerability. In certain embodiments, the policy is applied by a firewall, to block incoming traffic (e.g., traffic originating from an untrusted network) to the workload including the day one vulnerability.

In certain embodiments, a workload is inspected for suspicious activity. In an embodiment, suspicious activity corresponds to an event, a cluster of events, and the like, detected for example by a sensor deployed on the workload. In some embodiments, the sensor, an inspector, an inspection controller, and the like, are configured to tag a workload with a tag, a flag, and the like. In an embodiment, a firewall is configured with a policy such that network traffic to workloads in the computing environment which are tagged, flagged, and the like, is filtered.

According to another embodiment, a workload is inspected for an SSH (secure shell) cybersecurity risk. A cybersecurity risk associated with the SSH protocol is, for example, a weak password, an exposed certificate, a combination thereof, and the like. In an embodiment, the firewall is configured to block network traffic which is transmitted over SSH protocol to the workload after a predetermined number of access attempts, based on the detected cybersecurity risk. This is advantageous for example, in blocking brute force attacks to a workload.

FIG. 5 is an example schematic diagram of an inspection controller 124 according to an embodiment. The inspection controller 124 includes a processing circuitry 510 coupled to a memory 520, a storage 530, and a network interface 540. In an embodiment, the components of the inspection controller 124 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof. In an embodiment, the memory 520 is an on-chip memory, an off-chip memory, a combination thereof, and the like. In certain embodiments, the memory 520 is a scratch-pad memory for the processing circuitry 510.

In one configuration, software for implementing one or more embodiments disclosed herein may be stored in the storage 530, in the memory 520, in a combination thereof, and the like. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 is a magnetic storage, an optical storage, a solid-state storage, a combination thereof, and the like, and is realized, according to an embodiment, as a flash memory, as a hard-disk drive, or other memory technology, or any other medium which can be used to store the desired information.

The network interface 540 is configured to provide the inspection controller 124 with communication with, for example, the inspector 126, the security database 122, the firewall 118, and the like.

It should be understood that the embodiments described herein are not limited to the specific architecture illustrated in FIG. 5, and other architectures may be equally used without departing from the scope of the disclosed embodiments.

Furthermore, in certain embodiments the firewall 118, the inspector 126, the security database 122, and the like, may be implemented with the architecture illustrated in FIG. 5. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for providing dynamic network traffic policies, comprising:
    inspecting a workload for a cybersecurity object, the cybersecurity object indicating a cybersecurity risk, wherein the workload is deployed in a cloud computing environment having a firewall connected to an external network;
    detecting the cybersecurity risk on the workload based on the cybersecurity object;
    generating a policy for the firewall based on the cybersecurity risk; and
    configuring the firewall to apply the generated policy.

2. The method of claim 1, further comprising:
    detecting a second cybersecurity object on the workload; and
    detecting that the cybersecurity risk is a toxic combination based on the cybersecurity object and the second cybersecurity object.

3. The method of claim 2, wherein the cybersecurity risk is any one of: a misconfiguration, a vulnerability, an exposure, an attack path, a reachability path, and a combination thereof.

4. The method of claim 1, further comprising:
    determining a severity of the cybersecurity risk based on a detected cybersecurity object; and
    generating the policy based on the determined severity.

5. The method of claim 1, further comprising:
    detecting an original disk associated with the workload;
    cloning the original disk into an inspectable disk; and
    inspecting the inspectable disk for the cybersecurity object.

6. The method of claim 1, further comprising:
    configuring the firewall to block network traffic to the workload, in response to determining that the cybersecurity risk is of a first type.

7. The method of claim 1, further comprising:
    configuring the firewall to block network traffic to the workload, in response to determining that the cybersecurity object is of a first type.

8. The method of claim 1, further comprising:
    configuring the firewall, based on the generated policy, to block network traffic of a first type to the workload; and
    configuring the firewall, based on the generated policy, to allow network traffic of a second type to the workload.

9. The method of claim 1, further comprising:
    initiating a mitigation action based on the detected cybersecurity risk.

10. The method of claim 9, further comprising:
    configuring the firewall to remove the policy in response to detecting that the cybersecurity risk is removed from the workload.

11. A system for providing dynamic network traffic policies comprising:
    a processing circuitry;
    a memory, the memory containing instructions that, when executed by the processing circuitry, configure the system to:
    inspect a workload for a cybersecurity object, the cybersecurity object indicating a cybersecurity risk, wherein the workload is deployed in a cloud computing environment having a firewall connected to an external network;

detect the cybersecurity risk on the workload based on the cybersecurity object;
generate a policy for the firewall based on the cybersecurity risk; and
configure the firewall to apply the generated policy.

12. The system of claim 11, wherein the memory contains further instructions which when executed by the processing circuitry further configure the system to:
   detect a second cybersecurity object on the workload; and
   detect that the cybersecurity risk is a toxic combination based on the cybersecurity object and the second cybersecurity object.

13. The system of claim 12, wherein the cybersecurity risk is any one of:
   a misconfiguration, a vulnerability, an exposure, an attack path, a reachability path, and a combination thereof.

14. The system of claim 11, wherein the memory contains further instructions which when executed by the processing circuitry further configure the system to:
   determine a severity of the cybersecurity risk based on a detected cybersecurity object; and
   generate the policy based on the determined severity.

15. The system of claim 11, wherein the memory contains further instructions which when executed by the processing circuitry further configure the system to:
   detect an original disk associated with the workload;
   clone the original disk into an inspectable disk; and
   inspect the inspectable disk for the cybersecurity object.

16. The system of claim 11, wherein the memory contains further instructions which when executed by the processing circuitry further configure the system to:
   configure the firewall to block network traffic to the workload, in response to determining that the cybersecurity risk is of a first type.

17. The system of claim 11, wherein the memory contains further instructions which when executed by the processing circuitry further configure the system to:
   configure the firewall to block network traffic to the workload, in response to determining that the cybersecurity object is of a first type.

18. The system of claim 11, wherein the memory contains further instructions which when executed by the processing circuitry further configure the system to:
   configure the firewall, based on the generated policy, to block network traffic of a first type to the workload; and
   configure the firewall, based on the generated policy, to allow network traffic of a second type to the workload.

19. The system of claim 11, wherein the memory contains further instructions which when executed by the processing circuitry further configure the system to:
   initiate a mitigation action based on the detected cybersecurity risk.

20. The system of claim 19, wherein the memory contains further instructions which when executed by the processing circuitry further configure the system to:
   configure the firewall to remove the policy in response to detecting that the cybersecurity risk is removed from the workload.

21. A non-transitory computer-readable medium storing a set of instructions for providing dynamic network traffic policies, the set of instructions comprising:
   one or more instructions that, when executed by one or more processors of a device, cause the device to:
      inspect a workload for a cybersecurity object, the cybersecurity object indicating a cybersecurity risk, wherein the workload is deployed in a cloud computing environment having a firewall connected to an external network;
      detect the cybersecurity risk on the workload based on the cybersecurity object; and
      generate a policy for the firewall based on the cybersecurity risk; and
      configure the firewall to apply the generated policy.

* * * * *